United States Patent [19]

Römer et al.

[11] Patent Number: 5,466,738

[45] Date of Patent: Nov. 14, 1995

[54] MIXTURES OF LIQUID CRYSTALLINE COPOLYMERS AND FLUOROTHERMOPLASTICS, AND USE THEREOF

[75] Inventors: Michael Römer, Gross-Gerau; Andreas Schleicher, Einhausen; Peter Stamprech, Burgkirchen, all of Germany

[73] Assignee: Hoechst Aktiengesellschaft, Frankfurt, Germany

[21] Appl. No.: 277,367

[22] Filed: Jul. 19, 1994

Related U.S. Application Data

[63] Continuation of Ser. No. 981,767, Nov. 25, 1992, abandoned.

[30] Foreign Application Priority Data

Nov. 30, 1991 [DE] Germany ............... 41 39 547.6

[51] Int. Cl.[6] .............. C08L 67/03; C08L 67/04; C08L 77/12
[52] U.S. Cl. ..................... 524/508; 525/151
[58] Field of Search ............... 525/151; 524/508

[56] References Cited

U.S. PATENT DOCUMENTS

| | | | |
|---|---|---|---|
| 3,637,595 | 1/1972 | Cottis | 528/193 |
| 4,161,470 | 7/1979 | Calundann | 528/206 |
| 4,417,020 | 11/1983 | Bailey | 525/151 |
| 4,505,982 | 3/1985 | Hoheisel | 525/151 |
| 4,644,593 | 2/1987 | O'Brien . | |
| 4,945,130 | 7/1990 | Genz | 525/67 |

FOREIGN PATENT DOCUMENTS

| | | |
|---|---|---|
| 0271327 | 6/1988 | European Pat. Off. . |
| 63-230756 | 9/1988 | Japan . |
| 63-297447 | 12/1988 | Japan . |
| 1060651 | 3/1989 | Japan . |
| 1197551 | 8/1989 | Japan . |
| 1463617 | 2/1977 | United Kingdom . |

OTHER PUBLICATIONS

European Patent Office, Patent Abstracts of Japan, Publication No. JP 55-084321, Sep. 10, 1980.
European Patent Office, Patent Abstracts of Japan, Publication No. JP 3-095259, Apr. 19, 1991.
Chemical Abstracts, vol. 113, p. 94, abstract #113:80236w "Fluoropolymer Moldings with Low Thermal Expansion Coefficient".

*Primary Examiner*—Patricia A. Short
*Attorney, Agent, or Firm*—Connolly and Hutz

[57] ABSTRACT

Mixtures of liquid crystalline copolymers and fluorothermoplastics, and use thereof.

Mixtures of A) liquid crystalline copolymers and B) fluorothermoplastics, having a proportion of A) of 45 to 97% by weight and a proportion of B) of 3 to 55% by weight, have an improved notched impact strength. They are therefore particularly suitable for producing molded articles or as a matrix material for composites.

17 Claims, No Drawings

MIXTURES OF LIQUID CRYSTALLINE COPOLYMERS AND FLUOROTHERMOPLASTICS, AND USE THEREOF

This application is a continuation of application Ser. No. 07/981,767, filed Nov. 25, 1992, now abandoned.

The invention relates to mixtures of liquid crystalline copolymers and fluorothermoplastics that have an increased notched impact strength, and to the use thereof for the production of molded articles.

The synthesis and properties of liquid crystalline copolyesters (LCPs) and copolyester amides are the subject of numerous publications. One conventional process for producing them is melt condensation of the starting compounds, which ensures a high purity and a high molecular weight of the polymers (U.S. Pat. No. 4,161,470; (U.S. Pat. No. 3,637,595).

In recent times interest in liquid crystalline polyesters has increased, as evidenced by the appearance of a number of publications (EP-A 0 394 813; EP-A 0 390 489). All these publications refer to the unusual mechanical and rheological properties of the materials, particular emphasis being placed on their high moduli of elasticity and also their outstanding flowabilities and high shear rates. The materials also have a high notched impact strength. However, in many cases it is desirable that this last mentioned property exhibit even higher values, and it is therefore desirable to improve the liquid crystalline polyesters in this respect.

It is also known from the literature that important mechanical properties can be adjusted by mixing polymers. The ability to predict with certainty the properties of such polymer alloys/blends is, however, still a long way off, which means that the results of mixing various polymers remain largely empirical (Journal of Polymer Science, Polymer Physics Edition, Vol 21, p. 11 (1983)).

It has been found that the aforementioned object is achieved by blending liquid crystalline copolyesters and/or copolyester amides with fluorothermoplastics.

The invention relates to mixtures of A) liquid crystalline copolymers and B) fluorothermoplastics, the proportion of A) being 45 to 97% by weight and the proportion of B) being 3 to 55% by weight.

The liquid crystalline polymers A) used in the mixtures according to the invention are in general wholly aromatic polyesters that form anisotropic melts and have mean molecular weights (Mw=mean weight) from 2000 to 200,000, preferably from 3500 to 50,000, and in particular from 4000 to 30,000, g/mol. A class of liquid crystalline polymers suitable for the mixtures according to the invention is described in U.S. Pat. No. 4,161,470. These polymers are naphthoyl copolyesters with recurring structural units of the formulae I and II

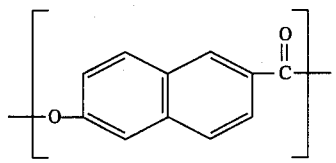

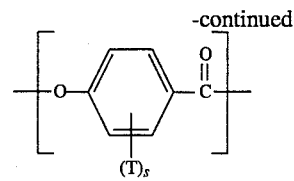

where T is selected from an alkyl radical, an alkoxy radical, in each case with 1 to 4 carbon atoms, or a halogen, preferably chlorine, bromine or fluorine, s is zero or an integer 1, 2, 3 or 4, and in the case of a plurality of radicals T these are, independently of one another, the same or different. The naphthoyl copolyesters contain 10 to 90, preferably 25 to 45, mol % of structural units of formula I, and 90 to 10, preferably 85 to 55, mol % of structural units of formula II.

Further liquid crystalline polyesters used for the mixtures according to the invention are described in EP-A-0 278 066 and U.S. Pat. No. 3,637,595. The oxybenzoyl copolyesters disclosed there contain structural units of the formulae III, IV and V, one or more of the aforementioned structural units being able to be present in each case.

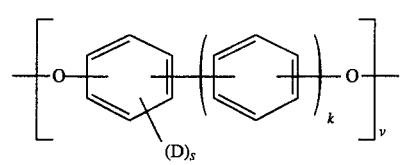

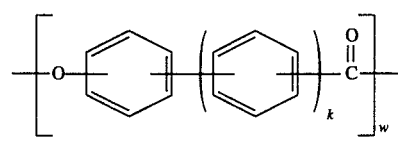

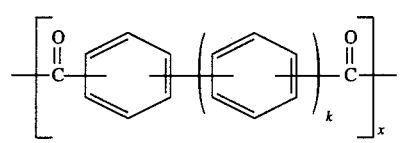

In the formulae III, IV and V, k is zero or 1, v, w and x are integers equal to or greater than 1, D is selected from an alkyl radical with 1 to 4 carbon atoms, an aryl radical, an aralkyl radical with in each case 6 to 10 carbon atoms, or a halogen such as fluorine, chlorine or bromine, s has the aforementioned meaning, and in the case of a plurality of radicals D these are, independently of one another, identical or different. The sum of the index numerals v, w and x has values from 30 to 600. The oxybenzoyl copolyesters contain in general 0.6 to 60, preferably 8 to 48, mol % of structural units of formula III, 0.4 to 98.5, preferably 5 to 85, mol % of structural units of formula IV, and 1 to 60, preferably 8 to 48, mol % of structural units of formula V, the proportions of the structural units of formulae III, IV and V totaling 100 mol %.

Copolyesters that contain, only structural units of formulae III and V are also suitable for the mixtures. These liquid crystalline polymers in general contain 40 to 60 mol % of structural units of formula III and 60 to 40 mol % of structural units of formula V. A molar ratio of 1:1 is preferred. Such polyesters are described for example in U.S. Pat. No. 4,60,765; U.S. Pat. No. 4,614,790 and U.S. Pat. No. 4,614,791.

Copolyesters that, in addition to the structural units selected from the formulae III to V, also contain structural units of formulae I and/or II, are likewise suitable, for example with a proportion of structural units of formula I of from 15 to 1 mol %, of formula II from 50 to 79 mol %, of formula III from 20 to 10 mol %, and of formula V from 20 to 10 mol %.

Copolyester amides that, besides one or more structural units of formulae I to V, in addition contain at least one structural unit of the formula VI

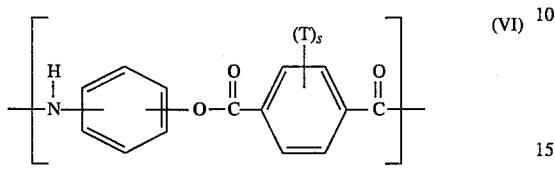

where T and s have the meanings given above, are likewise suitable for the mixtures according to the invention.

The blends according to the invention contain fluorothermoplastics with recurring units of the formula:

$$-(CF_2-CF_2)_m-(CF-CF_2)_n- \atop X \qquad (VII)$$

where X is O-R, in which R is a perfluorinated alkyl radical with 1 to 8 carbon atoms, and m and n are in each case numbers from 0.01 to 0.99, the sum of m and n having to be 1.

The blends according to the invention may furthermore contain fluorothermoplastics with recurring units of the formula:

$$-(CF_2-CF_2)_m-(CH_2-CH_2)_n- \qquad (VIII)$$

where m and n are as defined above.

Fluorothermoplastics that contain recurring structural units of the formula:

$$-(CF_2-CH_2)- \qquad (IX)$$

are also suitable for the mixtures according to the invention. The proportion of fluorothermoplastics in the mixtures according to the invention is in general 3 to 55% by weight and preferably 3 to 45% by weight; the proportion of liquid crystalline copolymers in the mixtures according to the invention is 97 to 45% by weight and preferably 97 to 55% by weight, the sum of the two polymers being 100% by weight. The mixtures according to the invention may contain one or more fluorothermoplastics and one or more liquid crystalline copolymers and also modified fluorothermoplastics and modified liquid crystalline polyesters. The mixtures are produced and processed by known standard methods conventionally used for thermoplastics, for example by kneading, extrusion, compression molding or injection molding.

The mixtures may additionally contain conventional additives, for example thermal and UV stabilizers, antistatics, flameproofing agents, dyes, pigments, inorganic and organic fillers, i.e. in particular reinforcing additives such as glass fibers, carbon fibers or high-modulus fibers. The mixtures are suitable for producing molded articles, for example in the form of tiles, fibers, sheeting/film, multipoint connectors and tubing, fabricated according to the injection molding or extrusion process, and in particular are also suitable as a matrix material for composites.

The following materials were used in the examples:

(A1) A liquid crystalline copolyester with recurring structural units of the formula

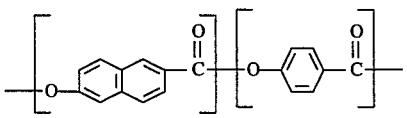

in which the proportion of oxynaphthoyl structural units is 20 mol % and the proportion of oxybenzoyl structural units is 80 mol %.

(A2) A liquid crystalline copolyester with structural units of the formula

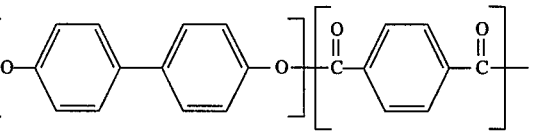

in which the proportion of oxynaphthoyl structural units is 4 mol %, the proportion of oxybenzoyl structural units is 60 mol %, the proportion of bisoxybisphenylene structural units is 18 mol %, and the proportion of bisbenzoyl structural units is 18 mol %.

(B1) A fluorothermoplastic with recurring units of the formula $$-(CF_2-CF_2)_m-(CF-CF_2)_n- \atop O-C_3F_7$$

where m is 0.05 and n is 0.95.

(B2) A fluorothermoplastic with recurring units of the formula $$-(CF_2-CF_2)_m-(CH_2-CH_2)_n-$$

where m and n have in each case values of 0.4 to 0.6. Depending on the ratio of m to n and the mean molecular weight, the melting point of the polymers is between 260° C. and 290° C.

The melt flow index (MFI) of said component (B1) is 15 g/10 min (375° C., 5 kg) and that of said component (B2) is 60 g/10 min (297° C.; 2 kg).

The materials were first of all dried (140° C. 24 hours) and then extruded in various weight ratios in an LSM 30.34 GL extruder, manufactured by Leistritz (Nuremberg, Federal Republic of Germany) under a protective gas (nitrogen) at temperatures of 310° C. to 340° C., and granulated The granules obtained were dried (140° C. 24 hours) and injection molded into molded articles such as shoulder bars and tiles, and their physical and thermal properties were investigated using the following machines:

A type 1455 tension-elongation machine manufactured by Zwick (Ulm, Federal Republic of Germany) to determine the percentage elongation at break, tensile strength at break, and the elastic modulus in tension.

A type 1454 bending-elongation machine manufactured by Zwick (Ulm, Federal Republic of Germany) to determine the flexural stresses, edge fiber elongation, and the elastic modulus in flexure.

The deflection temperature under load was determined according to DIN 53461 Method A.

The notched impact strength was determined according to IZOD ( ASTM D256-73 ) .

EXAMPLES 1) 80% by weight of the liquid crystalline copolyester (A1) and 20% by weight of the fluorothermoplastic (B1) were thoroughly dried, extruded together under nitrogen using an LSM 30.34 GL twin-screw extruder, granulated, and injection molded into shoulder bars and impact bars. Table 1 shows the mechanical properties determined for the mixture.

TABLE 1

| A1:B1 | 100:0 | 80:20 |
|---|---|---|
| Tensile strength at break (MPa) | 155 | 154 |
| Percentage elongation at break (%) | 3.3 | 3.6 |
| Modulus in tension (MPa) | 8530 | 8400 |
| Flexural stress at 3.5% (MPa) | 135 | 146 |
| Flexural strength (MPa) | 149 | 156 |
| Edge fiber elongation at maximum force | 7 | 5.1 |
| Modulus in flexure (MPa) | 6920 | 7560 |
| Notched impact strength (J/m) | 474 | 744 |
| HDT/A (°C.) | 175 | 179 |

2) 95 and 90% by weight of the liquid crystalline copolyester (A2) and respectively 5 and 10% by weight of the fluorothermoplastic (B2) were thoroughly dried and extruded together under nitrogen using the aforementioned twin-screw extruder, and were then granulated and injection molded as previously into shoulder bars and impact bars. Table 2 shows the mechanical properties determined for the mixtures.

TABLE 2

| A2:B2 | 100:0 | 95:5 | 90:10 |
|---|---|---|---|
| Tensile strength at break (MPa) | 108 | 106 | 105 |
| Percentage elongation at break (%) | 2.7 | 2.6 | 2.4 |
| Modulus in tension (MPa) | 7740 | 7280 | 7360 |
| Flexural stress at 3.5% (MPa) | 108 | 111 | 113 |
| Flexural strength (MPa) | 116 | 113 | 116 |
| Edge fiber elongation at maximum force | 4.7 | 4.3 | 4.0 |
| Modulus in flexure (MPa) | 6790 | 7210 | 7280 |
| Notched impact strength (J/m) | 261 | 294 | 312 |
| HDT/A (°C.) | 227 | 220 | 227 |

What is claimed is:

1. A molded article formed from a mixture of two thermoplastic materials, said mixture consisting essentially of:

A) 80 to about 97%, by weight of the mixture, of a liquid crystalline copolymer containing recurring units of the formulae

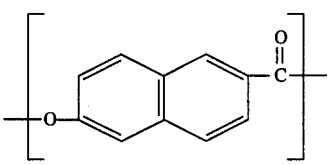 (I)

or

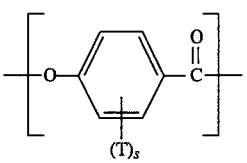 (II)

wherein the T radicals are identical or different and each is selected from the group consisting of an alkyl radical, an alkoxy radical, in each case with 1 to 4 carbon atoms, or a halogen, s is zero or an integer 1, 2, 3, or 4,; and B) about 3 to 20%, by weight of the mixture, of a fluorothermoplastic polymer containing recurring units of the formulae:

$$-(CF_2-CF_2)_m-(CH_2-CH_2)_n- \qquad (VIII)$$

or $$-(CF_2-CH_2)- \qquad (IX)$$

wherein m and n are numbers from 0.01 to 0.99, the sum of m and n always being 1.

2. A molded article as claimed in claim 1, wherein component A) is an aromatic polyester having a mean molecular weight of 200 to 200,000 or a copolyester amide.

3. A composite material containing, as a matrix, a molded article as claimed in claim 1.

4. A molded article as claimed in claim 1, wherein component (A) contains recurring units of both formula (I) and formula (II), and the ratio of the units (I) and (II) is 10:90 to 90:10 mol %.

5. A molded article as claimed in claim 1, wherein component (A) contains at least two of said recurring units.

6. A molded article as claimed in claim 1, wherein the mixture additionally contains thermal or UV stabilizers.

7. A molded mixture as claimed in claim 1, wherein the mixture additionally contains an antistatic agent.

8. A molded article as claimed in claim 1, wherein the mixture additionally contains a flame proofing agent.

9. A molded article as claimed in claim 1, wherein the mixture additionally contains a reinforcing additive selected from the group consisting of glass fibers, carbon fibers, or high modulus fibers.

10. A molded article as claimed in claim 1, wherein the mixture additionally contains dyes or pigments.

11. A molded article formed from a mixture of two thermoplastics, said mixture consisting essentially of:

A) 80 to about 97% by weight, based on the mixture, of a liquid crystalline copolymer containing recurring units of the formulae

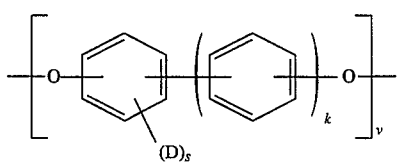

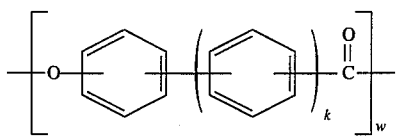

or

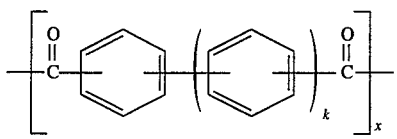

in which k is zero or 1, v, w, x are integers, equal to or greater than 1, and D is identical or different and is selected from the group consisting of an alkyl radical with 1 to 4 carbon atoms, an aryl radical, an aralkyl radical, in each case with 6 to 10 carbon atoms, or a halogen;

and at least one recurring unit of the formulae

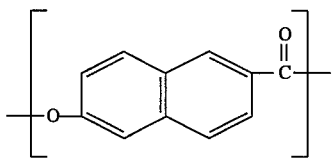

or

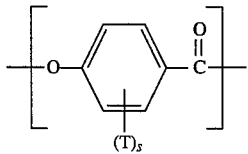

wherein the T radicals are identical or different and each is selected from the group consisting of an alkyl radical, an alkoxy radical, in each case with 1 to 4 carbon atoms, or a halogen and s is zero or an integer 1, 2, 3 or 4; and B) about 3 to 20% by weight, based on the mixture, of a fluorothermoplastic polymer containing recurring units of the formulae

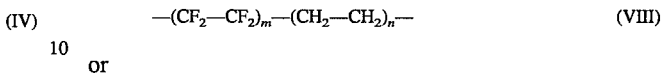

or

in which m and n are numbers from 0.01 to 0.99, the sum of m and n always being 1.

12. A molded article as claimed in claim 1, wherein the sum of the index numerals V, W, and X is 30 to 600.

13. A molded article as claimed in claim 12, wherein the units (III) are present in an amount of from 0.6 to 60 mol %.

14. A molded article as claimed in claim 12, wherein the units (IV) are present in an amount of from 0.4 to 98.5 mol %.

15. A molded article as claimed in claim 12, wherein the units (V) are present in an amount of from 1 to 60 mol %.

16. A molded article as claimed in claim 11, wherein component A) additionally contains, besides units (I) to (V), at least one structural unit

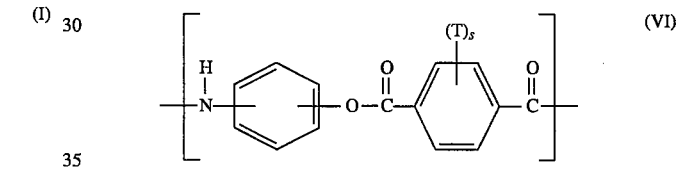

where T and s are as defined above.

17. A molded article as claimed in claim 11 wherein component A contains structural units in the following amounts: (I) 1 to 15 mol %, (II) 10 to 20 mol %, (III) 50 to 79 mol %, and (V) 10 to 20 mol %, the sum of all units always being 100 mol %.

* * * * *